(12) United States Patent
Takahashi et al.

(10) Patent No.: US 8,844,364 B2
(45) Date of Patent: Sep. 30, 2014

(54) QUALITY MANAGEMENT METHOD, QUALITY MANAGEMENT GAUGE, AND QUALITY MANAGEMENT GAUGE SET FOR SCREW COMPONENT

(75) Inventors: Masatsugu Takahashi, Machida (JP); Shinichi Okamoto, Yokohama (JP); Hitoshi Oohashi, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/116,954

(22) PCT Filed: Feb. 21, 2012

(86) PCT No.: PCT/JP2012/054078
§ 371 (c)(1),
(2), (4) Date: Nov. 11, 2013

(87) PCT Pub. No.: WO2012/153558
PCT Pub. Date: Nov. 15, 2012

(65) Prior Publication Data
US 2014/0069201 A1    Mar. 13, 2014

(30) Foreign Application Priority Data
May 12, 2011    (JP) .................................. 2011-106850

(51) Int. Cl.
*F16B 31/02* (2006.01)
*G01L 5/24* (2006.01)
*H01T 13/58* (2011.01)
*F02P 13/00* (2006.01)
*H01T 13/08* (2006.01)
*G01L 25/00* (2006.01)

(52) U.S. Cl.
CPC ................. *F16B 31/02* (2013.01); *G01L 5/243* (2013.01); *H01T 13/58* (2013.01); *F02P 13/00* (2013.01); *H01T 13/08* (2013.01); *G01L 25/00* (2013.01)
USPC .......................................................... 73/761

(58) Field of Classification Search
USPC .......................................................... 73/761
See application file for complete search history.

(56) References Cited

U.S. PATENT DOCUMENTS 6,782,594 B2 *   8/2004   Shoberg ...................... 29/407.03
8,578,793 B2 *   11/2013  Carlin ......................... 73/862.21
(Continued)

FOREIGN PATENT DOCUMENTS

JP       11-324878 A       11/1999
JP       2002-141156 A     5/2002
(Continued)

OTHER PUBLICATIONS

Korean Office Action, Apr. 10, 2014, 4 pages.

*Primary Examiner* — Freddie Kirkland, III
(74) *Attorney, Agent, or Firm* — Foley & Lardner LLP

(57) ABSTRACT

A management torque value smaller than a specified torque value is defined beforehand, and a screw ring-form, plug management gauge (11), which is capable of being screwed with plug (3), is prepared. Gauge (11) is provided with marked lines (14a, 14b) showing upper and lower limit positions of tolerance of the orientation of ground electrode (33) when plug (3) and gauge (11) have been screwed with each other. When plug (3) and gauge (11) have been screwed with each other and tightened at the management torque value, suitability of the phase position in the rotational direction is evaluated and managed by whether or not ground electrode (33) of plug (3) is in a range of marked lines (14a, 14b) showing the upper and lower limit positions of the tolerance. With this, it becomes possible to conduct a phase management with consideration of the crushing deformation characteristics of the gasket even with a torque lower than the specified tightening torque.

13 Claims, 10 Drawing Sheets

(56) References Cited

U.S. PATENT DOCUMENTS

| | | | |
|---|---|---|---|
| 8,628,367 B2 * | 1/2014 | Ozeki | 445/7 |
| 8,640,354 B2 * | 2/2014 | Ozeki | 33/613 |
| 2008/0238282 A1 * | 10/2008 | Kato et al. | 313/142 |
| 2011/0287683 A1 | 11/2011 | Ozeki | |
| 2011/0314687 A1 | 12/2011 | Ozeki | |

FOREIGN PATENT DOCUMENTS

| | | |
|---|---|---|
| JP | 2010-218828 A | 9/2010 |
| KR | 10-2009-0094508 | 9/2009 |
| WO | WO 2010-089992 A1 | 8/2010 |

* cited by examiner

A: ORIENTATION AT MEAN OF SPECIFIED TORQUE VALUES, MEAN AND ITS UPPER AND LOWER LIMITS
B: ORIENTATION AT LOWER LIMIT OF SPECIFIED TORQUE VALUES, MEAN AND ITS UPPER AND LOWER LIMITS
C: ORIENTATION AT UPPER LIMIT OF SPECIFIED TORQUE VALUES, MEAN AND ITS UPPER AND LOWER LIMITS

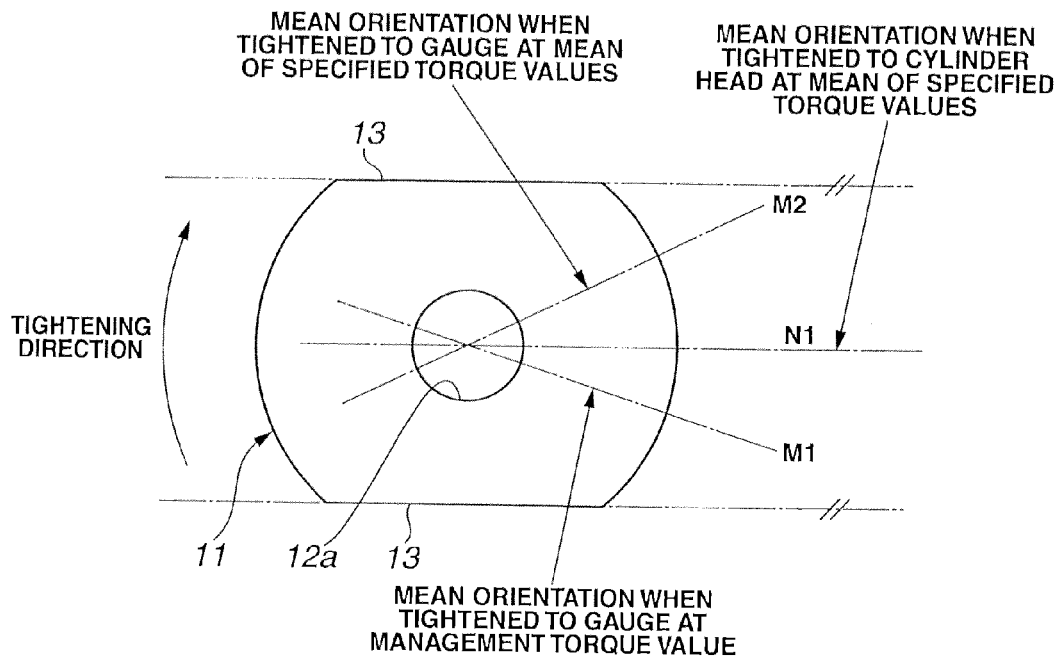
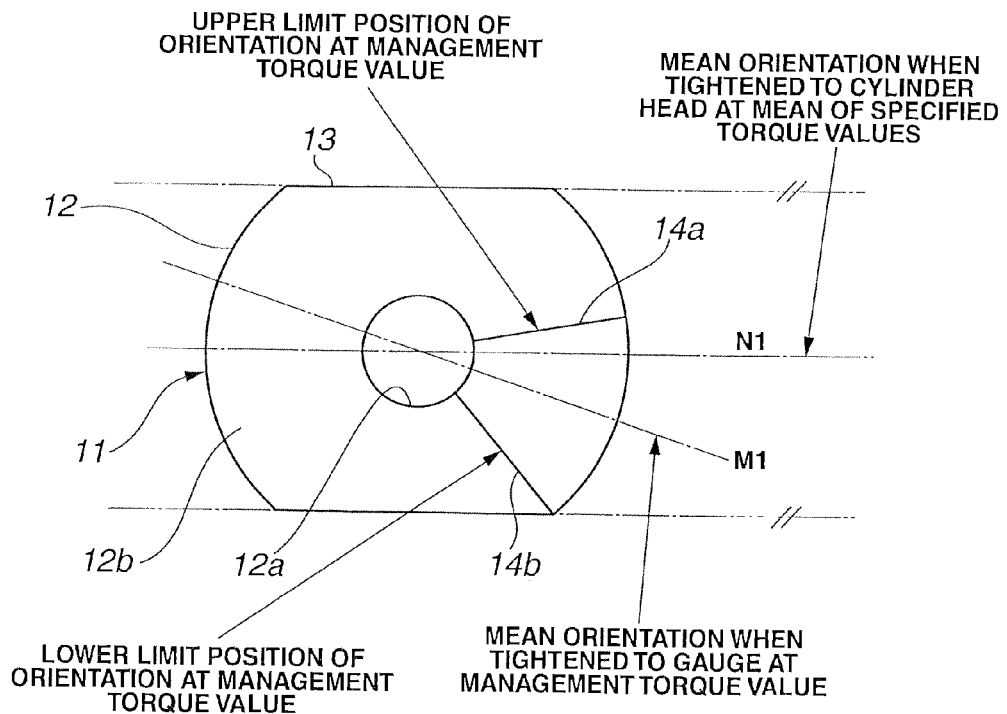

QUALITY MANAGEMENT METHOD, QUALITY MANAGEMENT GAUGE, AND QUALITY MANAGEMENT GAUGE SET FOR SCREW COMPONENT

TECHNICAL FIELD

The present invention relates to a quality control method of a screwed shaft component having a male screw portion or a screwed hole, and a gauge and a gauge set for the quality control, which are used in the method. It relates to a quality control method of, for example, a male screw portion of a spark plug that is to be mounted on a cylinder head of an internal combustion engine and the corresponding plug hole (screwed hole), and a quality control gauge and a quality control gauge set, which are used in the method.

BACKGROUND TECHNOLOGY

As publicly known, a spark plug (herein simply referred to as "plug") that is mounted on a cylinder head of an engine is fixed through a gasket in a manner that its forward-end portion side faces a combustion chamber by screwing the male screw portion on the metal main body side into the female screw portion on the plug hole side. In this case, there is a demand that the orientation (phase position in the rotational direction) of the ground electrode corresponding to the center electrode while facing the combustion chamber, should be adjusted to a particular orientation, from the viewpoints of cancelling the combustion variation among cylinders, improving the ignition quality, improving the fuel consumption, etc.

As a measure for that, there is proposed, for example, a method for producing spark plugs by using a male screw jig for producing spark plugs, as described in Patent Publication 1. According to the technology described in this Patent Publication 1, it is described that a screw-cutting phase angle range $\alpha$ is specified between the arrangement selection position of the ground electrode, which is capable of achieving the optimum ignition performance of the engine, and the origin position of the male screw jig by screwing the male screw jig into the plug hole on the side of the cylinder head. Furthermore, it is described that the joint position or joint-expected position of the ground electrode is defined as a joint phase angle range $\alpha 0$ at a position corresponding to the screw-cutting phase angle range $\alpha$, which is already specified by using the male screw jig, on the basis of the origin position on the side of the female screw jig, by screwing the female screw jig on the male screw portion on the side of the spark plug.

As publicly known, a plug is equipped beforehand with a gasket. When a plug is tightened and fixed to a plug hole on the side of the cylinder head, the gasket is crushed and deformed to secure a predetermined sealing performance. The actual orientation of the ground electrode is also largely dependent on the quality variation of the gasket and the crushing deformation characteristics. For example, as the crushing deformation characteristics of the gasket change, the degree of tightening of the plug also changes accordingly. Therefore, it is insufficient to conduct only the phase management of the joint position of the ground electrode as described in the above Patent Publication 1, in order to achieve the expected object. Thus, there is yet room for improvement.

On the other hand, it is also possible on the side of plug manufacturers to do a quality assurance to include the crushing deformation characteristics of gaskets. In that case, a gasket-equipped plug is tightened with a specified tightening torque as an inspection before shipping. Therefore, the gasket is every time necessarily subject to the crushing deformation. With this, its reuse becomes impossible. Furthermore, it leads to a result contrary to the fundamental principle of the manufacturers to ship plugs including gaskets under a brand-new condition from the viewpoint of sealing property assurance. Thus, it is not realistic.

PRIOR ART PUBLICATIONS

Patent Publications

Patent Publication 1: Japanese Patent Application Publication 2002-141156.

SUMMARY OF THE INVENTION

The present invention has been made by focusing on the above-mentioned task, and it is an object to provide a method capable of conducting a phase management in view of the crushing deformation characteristics of the gasket even if it is a torque lower than the specified tightening torque, etc.

The present invention is a method for previously managing the phase position in the rotational direction when a screw component having a sealing portion that demonstrates a sealing function by plastic deformation is tightened to the corresponding screw portion, which is the corresponding screwed hole, with a specified torque value. The screw component herein is supposed to be, for example, a spark plug or the like as a screw axis-shaped component that is previously equipped with a gasket as a sealing component subjected to plastic deformation. A management torque value lower than the above-mentioned specified torque value is previously determined, and a gauge having a screw portion that is capable of being screwed on the screw component is prepared.

Then, there are previously each determined the upper and lower limit positions of the tolerance of the phase position in the rotational direction in the screw component, when the screw component and the gauge are screwed together and tightened with the management torque value. It is judged as a non-defective product in case that a reference portion at the phase position in the rotational direction in the screw component is within a range of the upper and lower limit positions of the tolerance, and it is judged as a defective product in case that the reference portion at the phase position in the rotational direction is not within a range of the upper and lower limit positions of the tolerance, when the screw component and the gauge are screwed together and tightened with the management torque value.

According to the present invention, with respect to a screw component having a sealing portion that demonstrates a sealing function by achieving plastic deformation, it is possible to judge whether or not the phase position in the rotational direction of the screw component is at a specified position, on the assumption that it has been tightened with the specified torque, without applying the specified torque. Therefore, it is not necessary to subject the sealing portion to plastic deformation, and it does not lower the sealing performance, either.

BRIEF DESCRIPTION OF THE DRAWINGS

FIG. 9 is a diagram showing a relation between the characteristic shown in FIG. 7 and the plug management gauge shown in FIG. 8.

FIG. 10 is a bottom view of the plug management gauge shown in FIG. 8.

MODE FOR IMPLEMENTING THE INVENTION

Figure 1:
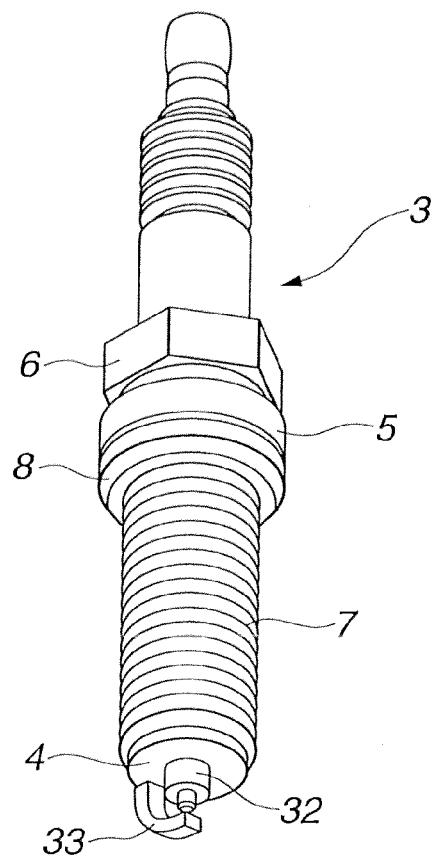
FIG. 1 is a perspective view showing an external shape of a spark plug as a more specific configuration for implementing the present invention.
Figure 2:
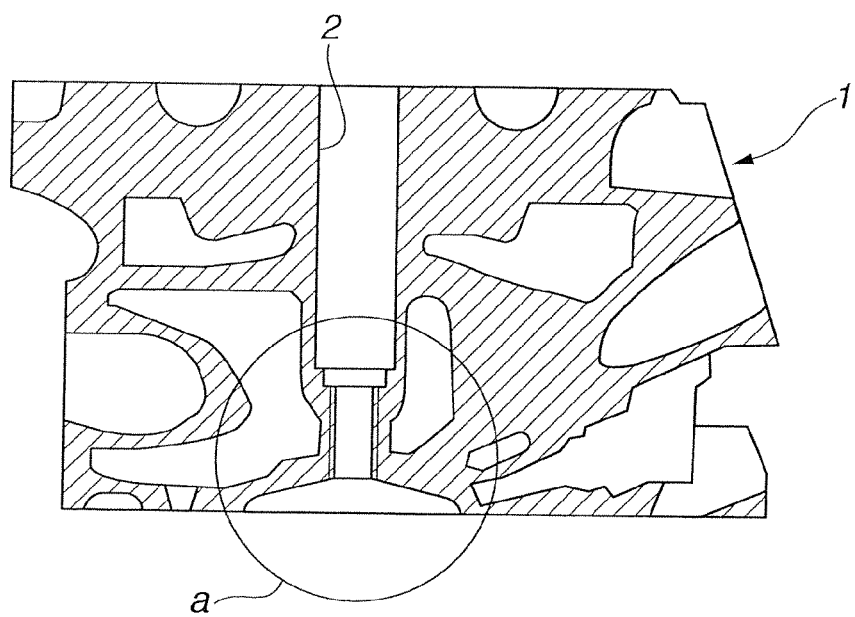
FIG. 2 is a sectional diagram showing a schematic structure of a cylinder head on which the spark plug of FIG. 1 is mounted.
Figure 3:
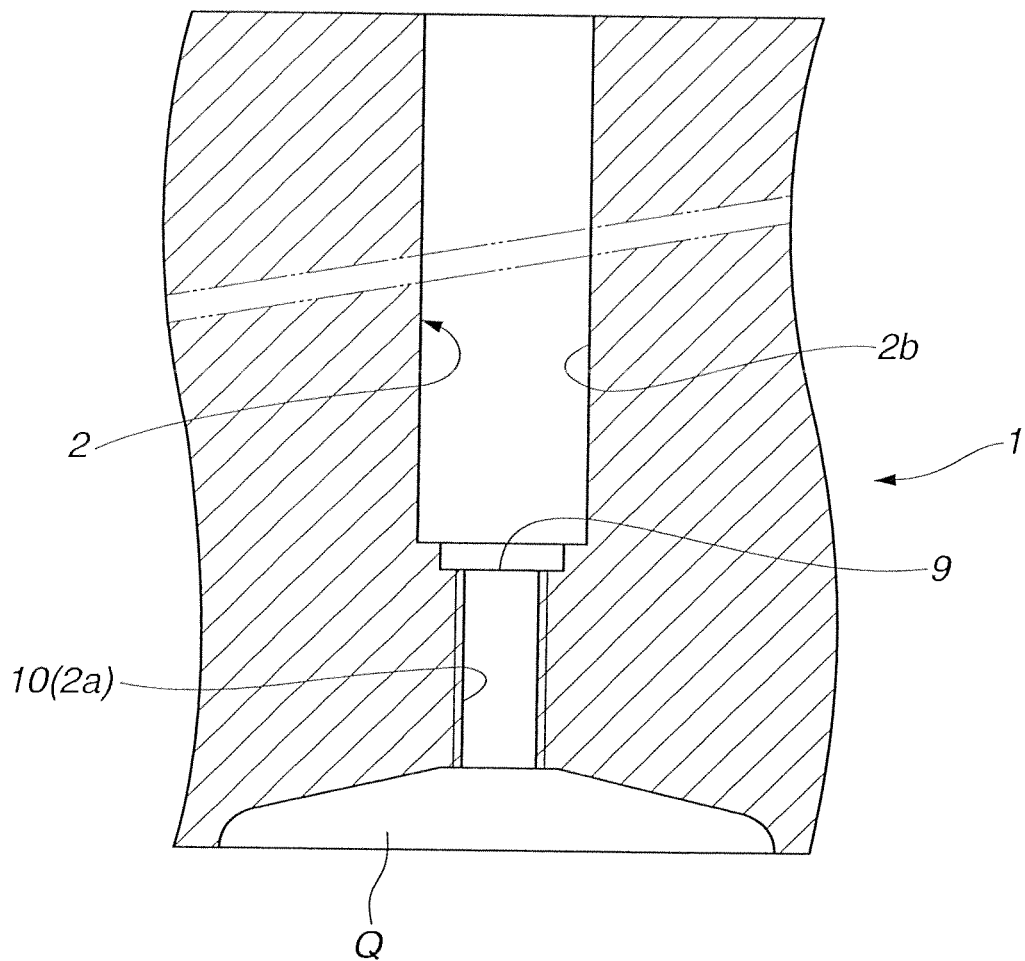
FIG. 3 is an enlarged view of "a" section in the plug hole of FIG. 2.
Figure 4:
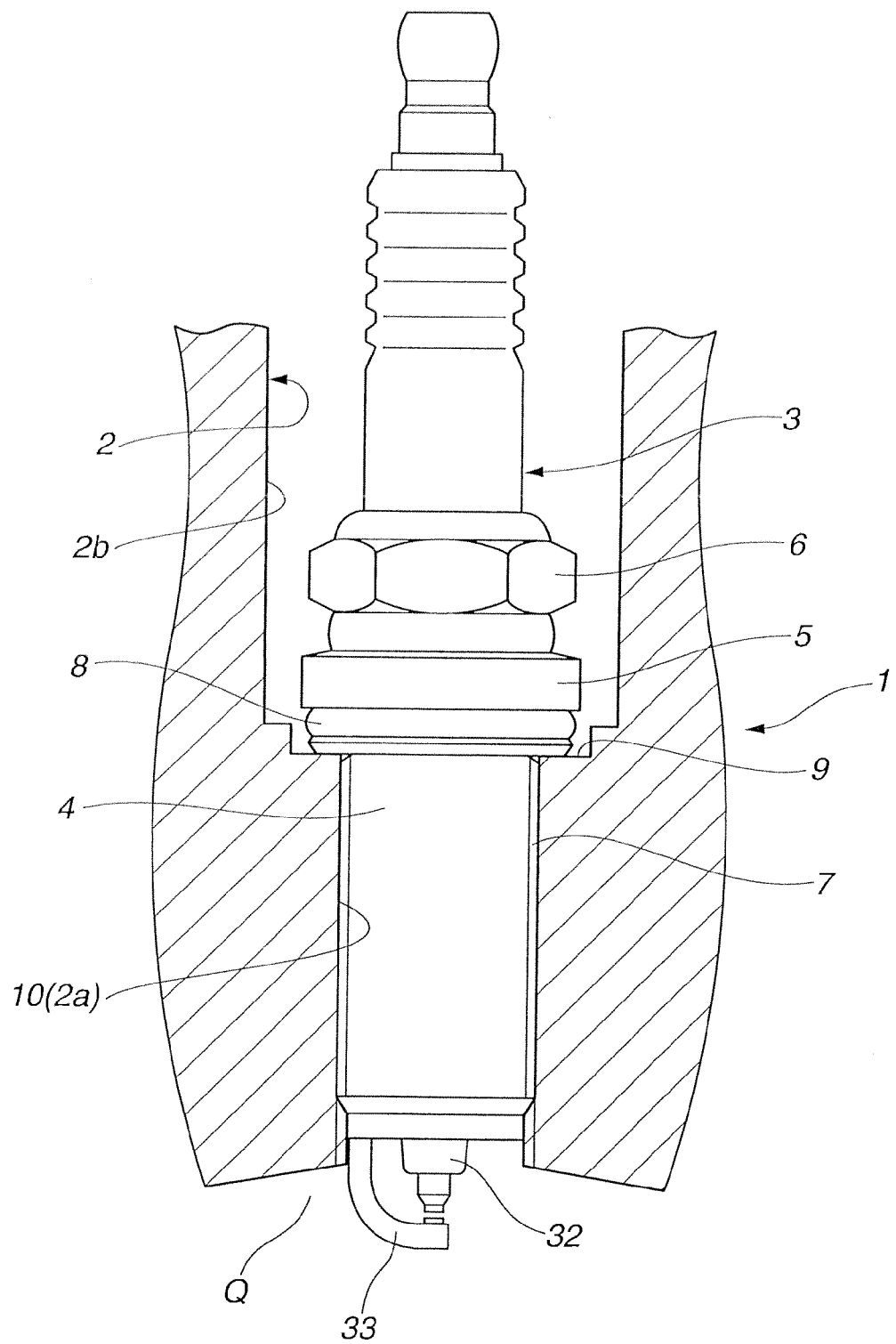
FIG. 4 is a sectional diagram showing a condition in which the spark plug is mounted into the plug hole of FIG. 3.

FIGS. 1-10 are views showing a more specific mode for implementing the present invention. In particular, FIG. 1 shows an external shape of spark plug (herein referred to as simply "plug") 3 as a screwed shaft component. FIGS. 2-4 show the structure of cylinder head 1 on which the above plug 3 is mounted.

In plug 3 produced as a mass-produced item by a plug manufacturer, as shown in FIG. 1, its metal main body 4 is formed with large-diameter barrel portion 5 and hexagonal portion 6, and is formed with male screw portion 7 adjacent to barrel portion 5. Furthermore, gasket 8 as a sealing component that is subjected to plastic deformation by a predetermined tightening torque is previously mounted on the side below neck of barrel portion 5. Center electrode 32 stands to project from the front end side of metal main body 4, and main metal body 4 is provided with generally L-shaped, ground electrode 33 corresponding to center electrode 32.

This plug 3 is previously determined in a manner that the phase in the rotational direction (the position in the rotational direction) of the screw-cutting start position of male screw portion 7 and the orientation (the direction in which ground electrode 33 is oriented) of ground electrode 33, when tightened to female screw portion 10 on the side of plug hole 2 in the after-mentioned cylinder head 1 with a specified torque value (herein, set at, for example, 10 N·m±α), are each managed in the production stage so that the relative positional relation of both becomes a particular positional relation. For example, the phase in the rotational direction of the screw-cutting start position of male screw portion 7 and the orientation of ground electrode 33 when tightened at the specified torque value are made to previously agree with each other.

On the other hand, as shown in FIGS. 2 and 3, cylinder head 1 is formed at each cylinder with a plug hole 2 in the form of a stepped hole, which is opened into combustion chamber Q. Plug 3 shown in FIG. 1 is mounted relative to this plug hole 2 in a screwed mode of FIG. 4. Plug hole 2 on the side of cylinder head 1 is formed of small diameter portion 2a close to combustion chamber Q and large diameter portion 2b connected thereto. Seating surface 9 is formed at a middle portion therebetween, and female screw portion 10 as a screw hole is formed on small diameter portion 2a. Plug 3 is tightened and fixed onto cylinder head 1 due to a screw action by a screwing of male screw portion 7 and female screw portion 10 together as a result of tightening of plug 3 at the specified torque value previously specified, and barrel portion 5 on the side of plug 3 is seated on seating surface 9 through gasket 8. As a result, center electrode 32 and its corresponding ground electrode 33 face combustion chamber Q.

Herein, as mentioned above, if the phase in the rotational direction (the position in the rotational direction) of the screw-cutting start position of male screw portion 7 and the orientation (the direction in which ground electrode 33 is oriented) of ground electrode 33, when tightened to female screw portion 10 on the side of plug hole 2 in the after-mentioned cylinder head 1 with a specified torque value, are each managed in the production stage so that it is previously determined that the relative positional relation of both becomes a particular positional relation, and if it is managed in a manner that the phase in the rotational direction of the screw-cutting start position of female screw portion 10 on the side of plug hole 2 similarly becomes a particular position, ground electrode 33 is always made to have a particular orientation in principle by only tightening plug 3 relative to plug hole 2 at the specified torque value. Therefore, ground electrode 33 becomes a reference portion of the phase position in the rotational direction in plug 3.

On the other hand, when plug 3 is tightened into plug hole 2, gasket 8 is interposed between plug 3 and seating surface 9 for securing sealing property and is subjected to crushing deformation (plastic deformation). Therefore, it is not possible to neglect dimensional variation, crushing deformation characteristics, etc. of this gasket 8. With no quantitative grasp of these crushing deformation characteristics, etc. of gasket 8, it is not possible to accurately manage the orientation of ground electrode 33, as mentioned above.

Figure 5:
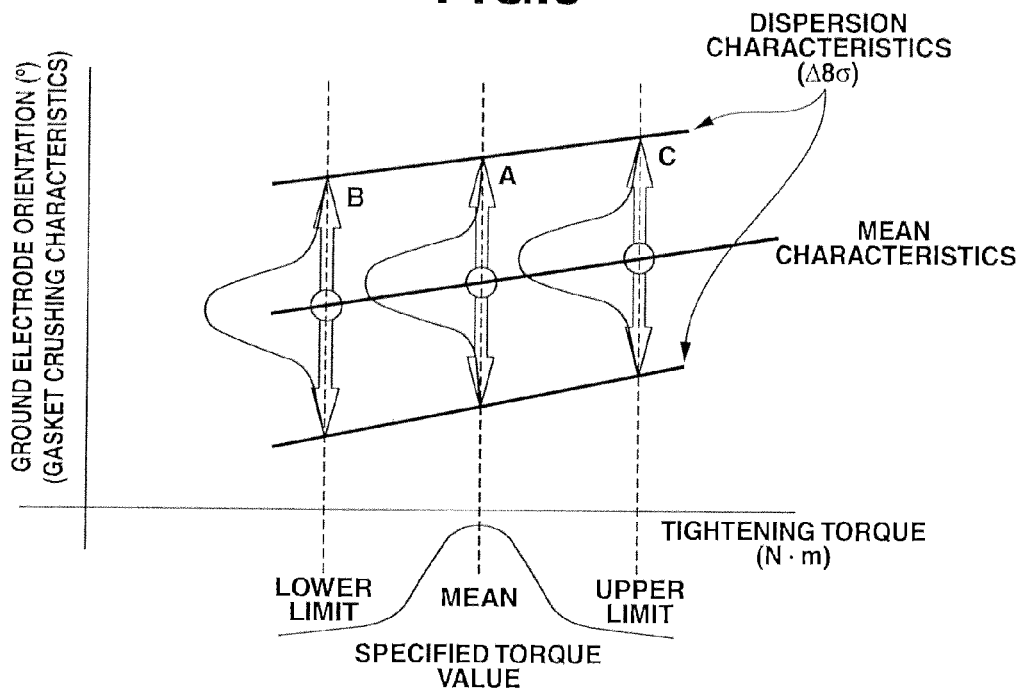
FIG. 5 is a characteristic graph showing a correlation between the tightening torque of the spark plug and the orientation of the ground electrode.

It is usual that the specified torque value when tightening and fixing plug 3 into plug hole 2 on the side of cylinder head 1 has upper and lower tolerances relative to the standard value (mean of the specified torque values), as exemplified above as, for example, 10 N·m±α. Therefore, a correlation between the specified torque value, the orientation of ground electrode 33, and the crushing deformation characteristics of gasket 8 is assumed to have characteristics shown in FIG. 5 on the basis of a statistical method of experimental results, etc. In FIG. 5, the standard value of the specified torque values is denoted by mean, and similarly the maximum tolerance of the specified torque value is denoted by the upper limit, and the minimum tolerance of the specified torque value is denoted by the lower limit. It is ideal that each plug 3 is guaranteed to satisfy the characteristics of FIG. 5 at the time of shipment of plug manufacturers. As mentioned above, when plug 3 is tightened at the specified torque value at an inspection stage to guarantee the characteristics of FIG. 5, gasket 8 is subjected to crushing deformation each time. Therefore, it is not realistic.

Thus, in the present embodiment, a concept of management torque value smaller than the specified torque value is introduced, and this management torque value is previously set at a particular value. For example, as mentioned above, if the specified torque value (mean) for tightening plug 3 is set at, for example, 10 N·m±α, the management torque value is set at a value extremely smaller than the specified torque value (mean), that is, for example, 0.5 N·m, at which, even if plug 3 with gasket 8 is tightened, the gasket is not subjected to crushing deformation.

Figure 6:
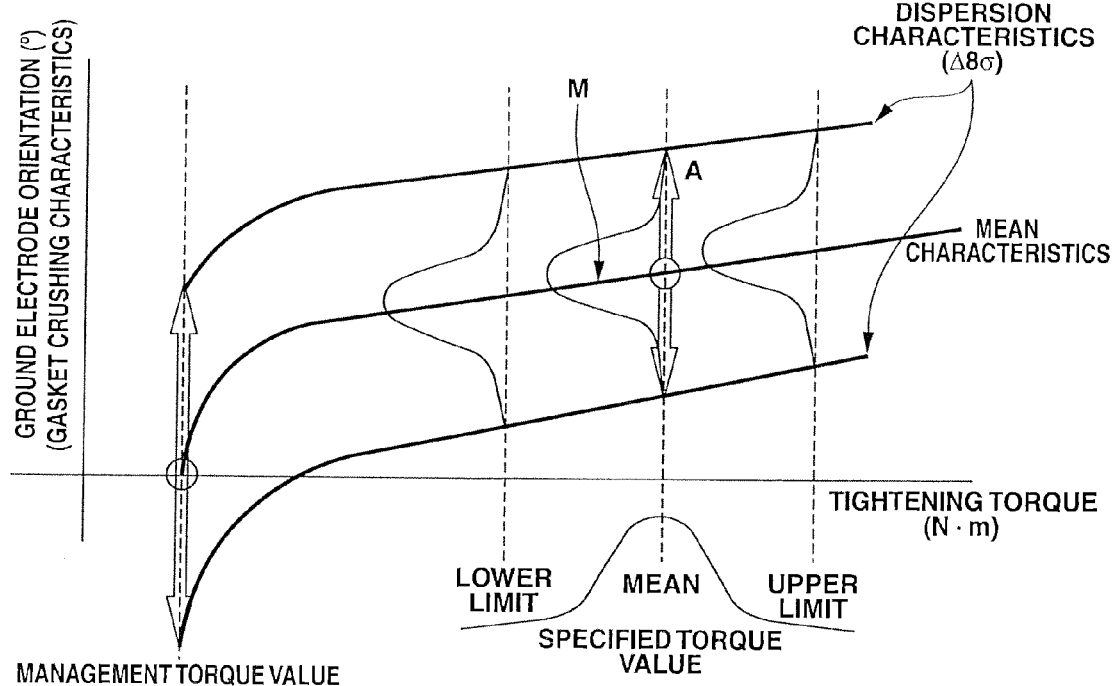
FIG. 6 is similarly a characteristic graph showing a correlation between the tightening torque of the spark plug and the orientation of the ground electrode.

Characteristics shown in FIG. 6 are obtained by determining a correlation between this management torque value, the orientation of ground electrode 33, and crushing deformation characteristics of gasket 8 by a statistical method of experimental data, etc. and then superposing it on the characteristics of FIG. 5. As is clear from FIG. 6, under the management torque value, dispersion of the orientation of ground electrode 33 and crushing deformation characteristics of gasket 8 is relative large, but it becomes the same as the characteristics of FIG. 5 at the specified torque value.

Figure 7:
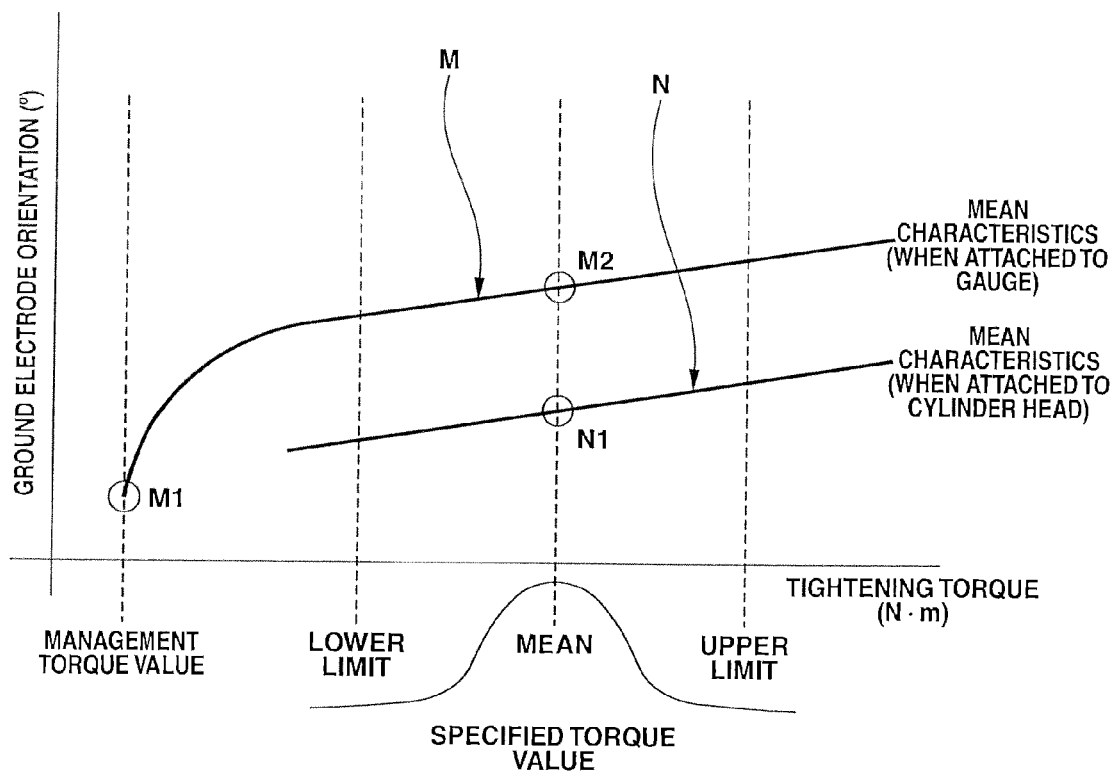
FIG. 7 is similarly a characteristic graph showing a correlation between the tightening torque of the spark plug and the orientation of the ground electrode.

Only mean characteristic M of FIG. 6 is extracted and copied into FIG. 7. The correlations of FIGS. 5 and 6 forming the basis of mean characteristic M of FIG. 7 are based on data collected by tightening, for example, an exclusive, screwed ring form, gauge or jig made by tool steel or the like relative to plug 3 equipped with gasket 8. More strictly speaking, due to the difference of material of the corresponding side, it does not reproduce the actual mounting condition when plug 3 has been tightened relative to plug hole 2 of cylinder head 1 produced by, for example, aluminum alloy, etc.

Thus, with respect to a characteristic similar to mean characteristic M of FIG. 7, as the mean characteristic when tightened to plug hole 2 of the actual cylinder head 1 is shown, it results in N of FIG. 7. This is an example due to the difference of torque coefficient between the material of cylinder head 1 and the material of the gauge or jig. When paying attention to the dispersion of the orientation of ground electrode 33, characteristic N becomes relatively smaller than characteristic M. When paying attention to the phases of three points of M1, M2 and N1 of FIG. 7, as a matter of course, point M1 at the management torque value has a tendency of delay relative to point N1 in phase, and point M2 has a tendency of being in advance of point N1 in phase, in the direction of tightening plug 3.

Upon conducting quality control of plug 3 produced, as shown in FIGS. 8(A) and 8(B), there is used a screw ring-form, plug management gauge 11 having female screw portion 12a. This plug management gauge 11 is produced, for example, by using plug 3 itself finished with a high precision as a master gauge and copying this. It is formed at a center portion of gauge main body 12 of a predetermined thickness with female screw portion 12a capable of being screwed on male screw portion 7 on the side of plug 3. It is formed on the outer peripheral surface with a two-sided width portion, which becomes an indicator of the orientation of the after-mentioned ground electrode 33, that is, two-sided width portion 13, which can be observed from outside.

Figure 8:
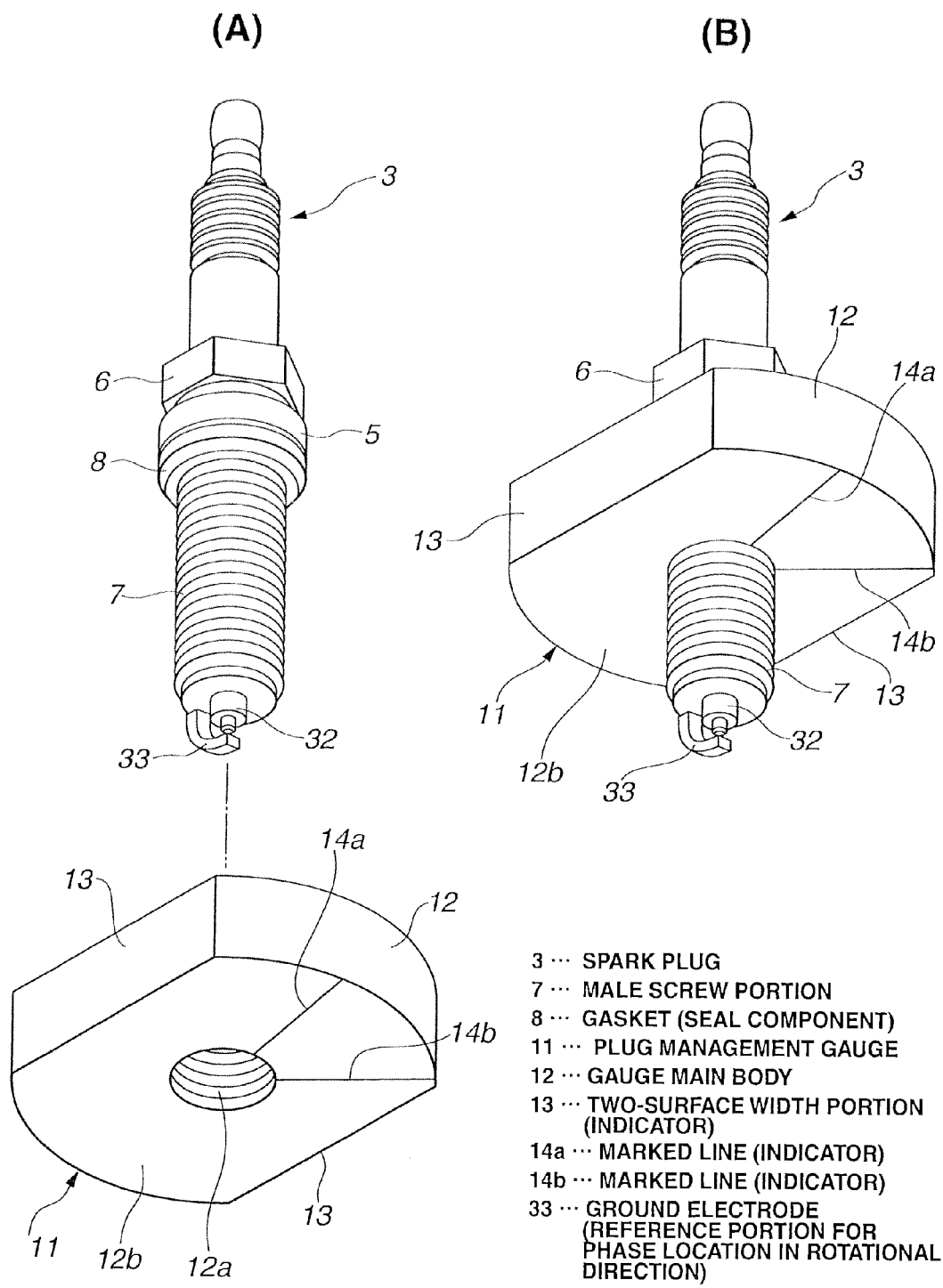
FIG. 8(A) is a perspective view showing a relation between the plug shown in FIG. 1 and the plug management gauge.
FIG. 8(B) is a perspective view showing a condition in which the plug management gauge has been screwed on the plug.

The relation between screw ring-form, plug management gauge 11 shown in FIG. 8 and the mean characteristics shown in FIG. 7 is shown in FIG. 9. Line N1 of FIG. 9 is nothing else than phase of point N1 of mean characteristics N of FIG. 7. It shows the orientation of ground electrode 33 when plug 3 has been tightened relative to plug hole 2 of cylinder head 1 at mean of the specified torque value, that is, the center orientation in dispersion of the orientation of ground electrode 33, and in turn the target orientation of ground electrode 33. Therefore, two-sided width portion 13 of plug management gauge 11 is formed to be parallel with this line N1.

Line M2 of FIG. 9 is nothing else than phase of point M2 of mean characteristics M of FIG. 7. As mentioned above, it shows the orientation of ground electrode 33 when plug 3 has been tightened relative to the screw ring-form gauge or jig at mean of the specified torque values, that is, the center orientation of the dispersion of the orientation of ground electrode 33. Furthermore, line M1 of FIG. 9 is nothing else than phase of point M1 of mean characteristics M of FIG. 7. As mentioned above, it shows the orientation of ground electrode 33 when plug 3 has been tightened relative to the screw ring-form gauge or jig at management torque value smaller than the specified torque value. Therefore, line M1 of FIG. 9 has a tendency of delay relative to line N1 in phase, and line M2 has a tendency of being in advance of line N1 in phase, in the direction of tightening plug 3.

Thus, with respect to gauge main body 12 of plug management gauge 11 shown in FIGS. 8(A) and 8(B), as shown in these drawings and FIG. 10, on one surface 12b, to which ground electrode 33 faces when this has been screwed with plug 3 and tightened, two marked lines 14a and 14b as observable indicators are formed by scribed lines, etc.

Specifically, supposing that line N1 and line M1 of FIG. 9 are copied into FIG. 10 as they are, as mentioned above, line N1 of FIG. 10 shows the orientation of ground electrode 33 when plug 3 has been tightened relative to plug hole 2 of cylinder head 1 at mean of the specified torque values, that is, the center orientation in dispersion of the orientation of ground electrode 33, and in turn the target orientation of ground electrode 33. Furthermore, as mentioned above, line M1 of FIG. 10 shows the orientation of ground electrode 33 when plug 3 has been tightened relative to the screw ring-form gauge or jig at the management torque value smaller than the specified torque value. Therefore, the upper limit position (the advance side in the rotational phase direction) of dispersion of the orientation of ground electrode 33 when plug 3 has been tightened at the management torque value is formed as marked line 14a, and the lower limit position (the delay side in the rotational phase direction) is formed as marked line 14b. A sectorial region surrounded by these marked lines 14a, 14b is nothing else than dispersion of ground electrode 33 under the management torque value shown on the leftist side of FIG. 6.

Although line N1 itself of FIG. 9 is not copied nor formed as the marked line on gauge main body 12 of FIGS. 8 and 10, as mentioned above, line N1 is copied and formed as two-sided width portion 13, which is parallel therewith.

Therefore, in quality control of plug 3 on the side of plug manufacturers, as shown in FIG. 8, when tightening plug management gauge 11 relative to male screw portion 7 of plug 3, as mentioned above, it is tightened under the management torque value smaller than the specified torque value. At that time, whether or not the orientation of ground electrode 33 is in the region surrounded by two marked lines 14a, 14b is checked by visual inspection to evaluate suitability of orientation of ground electrode 33. Only if the orientation of ground electrode 33 is in the region surrounded by two marked lines 14a, 14b, there is guaranteed at least a quality of the orientation of ground electrode 33 on the side of plug manufacturers.

Furthermore, when plug 3 thus guaranteed on the side of a plug manufacturer is actually tightened relative to plug hole 2 on the side of cylinder head 1 as shown in FIG. 4, it is tightened by aiming at mean of the specified torque values. Therefore, this is nothing else but a tightening by which line N1 takes the position of the former line M1 in FIG. 10. As a result, when plug 3 has actually been tightened relative to plug hole 2 on the side of cylinder head 1, even if the orientation of ground electrode 33 has dispersed, it fits into the range of dispersion A of FIG. 6. With this, it becomes possible to always adjust the orientation of ground electrode 33 of plug 3 mounted on cylinder head 1 to a particular orientation.

Herein, the above-mentioned marked lines 14a, 14b as indicators function as only marks. Therefore, in place of this, it is optional to take a manner of putting arbitrary markings such as punching, painting, etc.

Next, the management method of plug hole 2 on the side of cylinder head 1 shown in FIGS. 2 and 3 is explained.

As mentioned above, in order to always adjust the orientation of ground electrode 3 of plug 3 mounted on cylinder head 1 to a particular orientation, it is necessary to conduct a management that the screw-cutting start position in female screw portion 10 of plug hole 2 also takes a particular phase in the rotational direction. Upon this, due to the relation between male screw portion 7 and female screw portion 10 screwed with each other, it is also desirable to manage female screw portion 10 on the side of plug hole 2 by the same standard as that of male screw portion 7 on the side of plug 3. Thus, plug hole management gauge 15 shown in FIG. 11 is produced on the basis of the above plug management gauge 11 in a manner of copying this.

In more detail, as mentioned above, with respect to cylinder head 1 of FIGS. 2-4, on which there is to be mounted the plug 3 that the phase in the rotational direction of the screw-cutting start position of male screw portion 7 and the relative positional relation between the phase in the rotational direction thereof and the orientation of ground electrode 33 are controlled by plug management gauge 11, when conducting a machining of plug hole 2 in the production process of cylinder head 1, particularly when conducting a tapping work of female screw portion 10 of plug hole 2, it is controlled that the phase in the rotational direction at the screw-cutting start position of female screw portion 10 is at a particular position.

Figure 11:
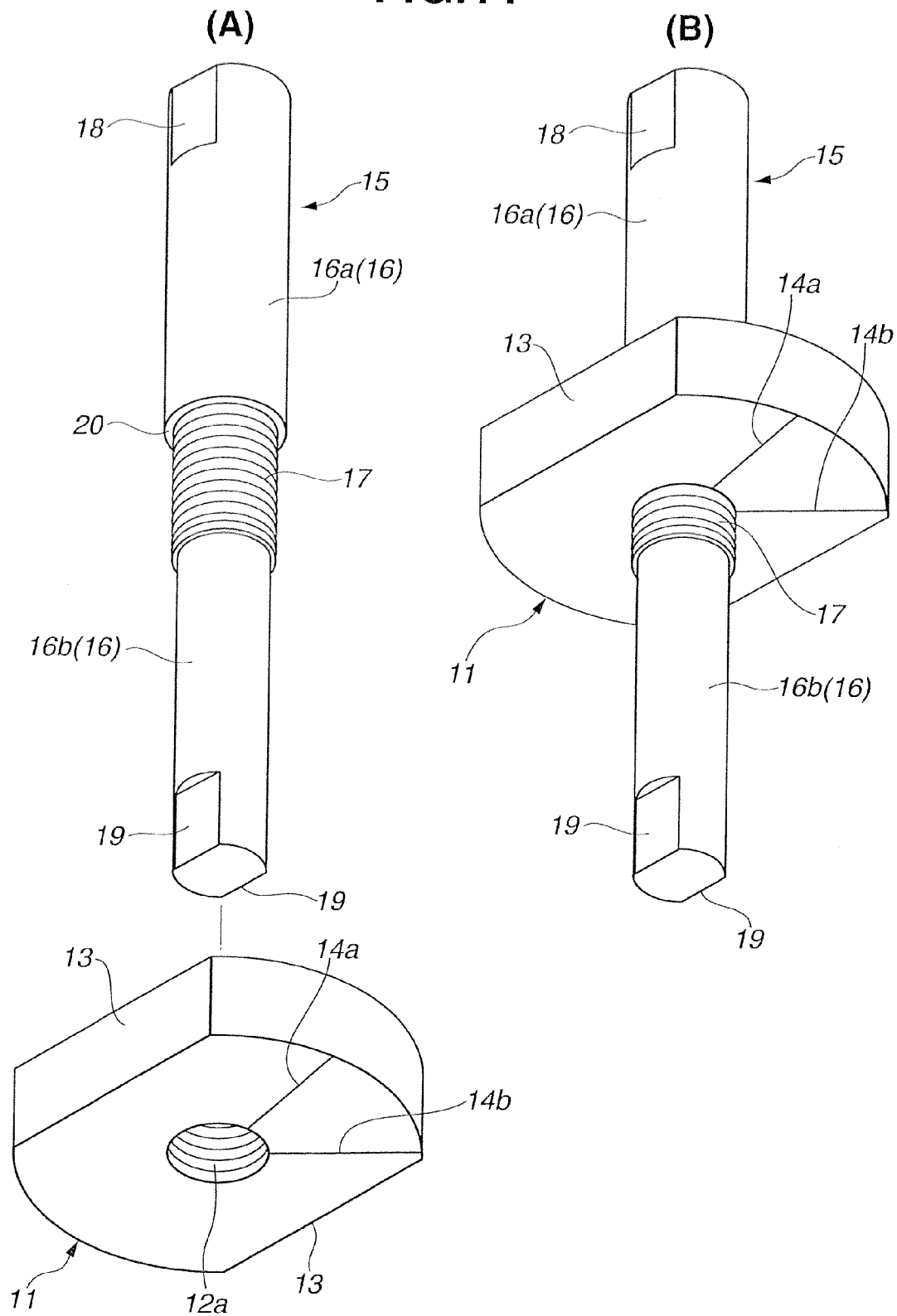
FIG. 11(A) is a perspective view showing a relation between the plug management gauge shown in FIG. 8 and the plug-hole management gauge.
FIG. 11(B) is a perspective view showing a condition in which the plug management gauge and the plug-hole management gauge of FIG. 11(A) have been screwed together.

When conducting quality control of female screw portion 10 in plug hole 2 on the side of this cylinder head 1, there is used a screwed, plug hole management gauge 15 with male screw portion 17 as shown in FIG. 11. This plug hole management gauge 15 is one produced by using the above-mentioned plug management gauge 11 as a master gauge and, based on the plug management gauge 11, copying this. Plug hole management gauge 15 is formed with a stepped, shaft-form gauge main body 16 as a main component to have a large-diameter shaft portion 16a and a small-diameter shaft portion 16b. Over a predetermined range on the side of the opposite of large-diameter shaft portion 16a from the position of small-diameter shaft portion 16b which is nearest to large-diameter shaft portion 16a, male screw portion 17 similar to male screw portion 7 on the side of plug 3 is formed. Furthermore, large-diameter shaft portion 16a and small-diameter shaft portion 16b are formed at their respective shaft ends with two-sided, width portions that become indicators of the after-mentioned ground electrode 33, that is, two-sided, width portions 18, 19, which make it possible to conduct visual inspection from outside.

As is explained based on FIG. 6, plug management gauge 11 acting as a benchmark of this plug hole management gauge 15 simulates a condition in which, when tightened to plug 3 at mean of the specified torque values, the orientation of ground electrode 33 on the side of plug 3 indicates the center position of dispersion of the orientation. Therefore, as shown in FIG. 11, when plug hole management gauge 15 and plug management gauge 11 are screwed with each other and tightened at mean of the specified torque values, they are designed so that the two-sided widths 13, 18 and 19 of them become parallel with each other.

That is, as shown in FIG. 11, when screw ring-form, plug management gauge 11, which functions as a master gauge of plug hole management gauge 15, is tightened relative to screw shaft-form, plug hole management gauge 15 at mean of the specified torque values, which is similar to that of the actual plug 3 to be seated on stepped shoulder portion 20 of large-diameter shaft portion 16a, two-sided width portions 18, 19 are each formed to be parallel with the direction (orientation of ground electrode 33), which is the phase in the rotational direction of ground electrode 33. In other words, two-sided width portion 13 of screw ring-form, plug management gauge 11, which functions as a master gauge of plug hole management gauge 15, is designed beforehand as mentioned above to be parallel with the direction (orientation of ground electrode 33), which is the phase in the rotational direction of ground electrode 33, when tightened to the actual plug 3. Therefore, as shown in FIG. 11, they are so designed that, when plug management gauge 11 is tightened to plug hole management gauge 15 at mean of the specified torque values to be seated on shoulder portion 20 of large-diameter shaft portion 16a, two-sided width portion 13 of plug management gauge 11 and two-sided width portions 18, 19 of plug hole management gauge 15 become parallel with each other.

Figure 12:
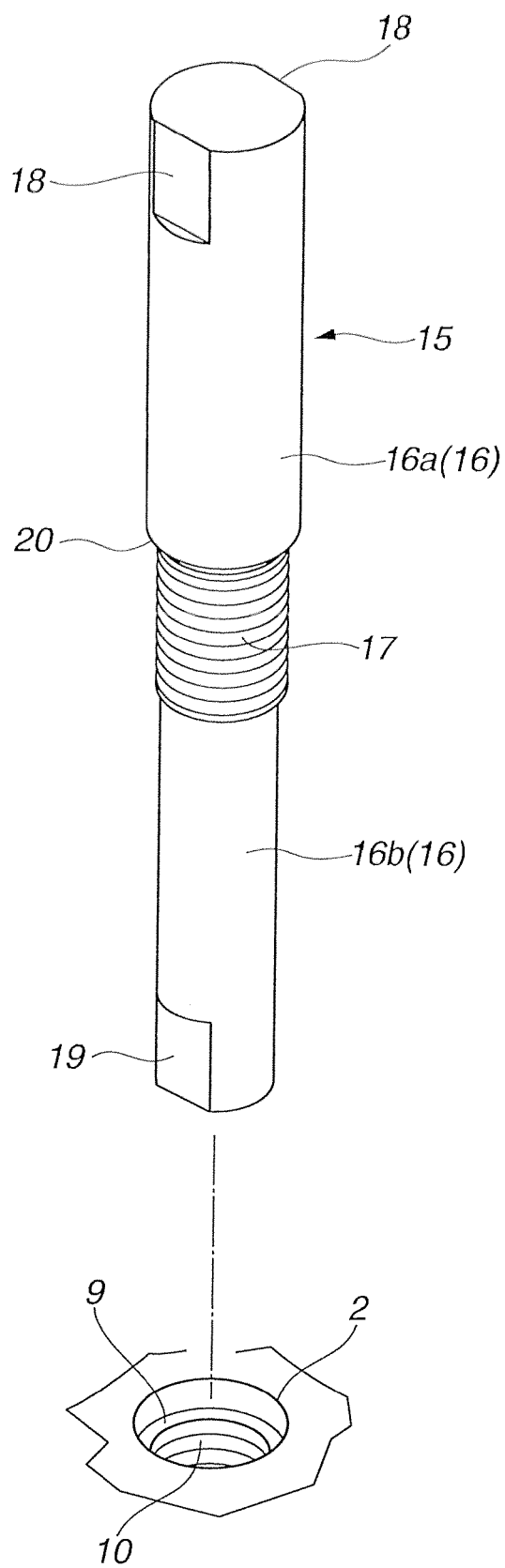
FIG. 12 is a perspective view showing a relation between the plug-hole management gauge shown in FIG. 11 and the plug hole.

Therefore, when conducting total inspection or sampling inspection of plug hole 2 in the produced cylinder head 1, as shown in FIGS. 2 and 3 and FIG. 12, the quality control is conducted by evaluation of whether or not two-sided width portions 18, 19 of plug hole management gauge 15, which become indicators of the orientation of ground electrode 33, are oriented in a particular direction, when plug hole management gauge 15 alone, with which plug management gauge 11 is not screwed, is screwed into female screw portion 10 of plug hole 2 finished with mechanical working and tightened until an arbitrary tightening torque (management torque) at which the measurement direction becomes stable.

In this case, it is also possible that, for example, another jig to function as an indicator is connected with two-sided width portion 19 of plug hole management gauge 15, which faces combustion chamber Q, and the orientation of ground electrode 33 is indicated by angle on the basis of a particular position on the side of the combustion chamber.

Figure 13:
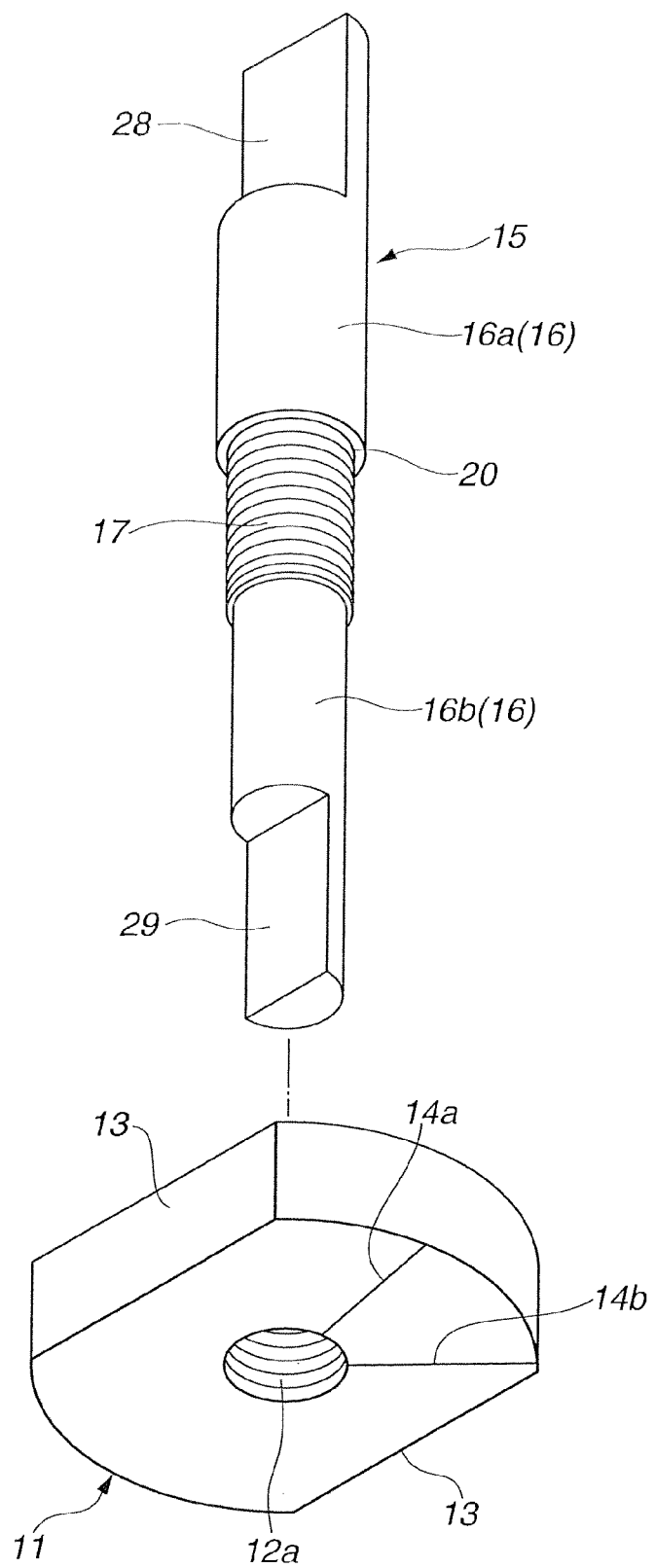
FIG. 13 is a perspective view showing a modified example of the plug-hole management gauge shown in FIG. 11.

Furthermore, an equivalent function is demonstrated even by forming single, flat surfaces 28, 29, which are parallel with the axis of gauge main body 16, as shown in FIG. 13, in place of two-sided width portions 18, 19 of plug hole management gauge 15 shown in FIGS. 11 and 12.

Thus, quality control of plug 3 that the phase in the rotational direction of the screw-cutting start position of male screw portion 7 and the relative positional relation between the phase in the rotation direction thereof and the orientation of ground electrode 33 are specified beforehand is conducted by using screw ring-form, plug management gauge 11, and in contrast quality control of plug hole 2 on the side of cylinder head 1 that the phase in the rotational direction of the screw-cutting start position of female screw portion 10, into which plug 3 is mounted, is specified beforehand is conducted by using screw shaft-form, plug hole management gauge 15. With this, ground electrode 33 on the side of plug 3, which turns to face in combustion chamber Q, is always oriented in the same specific direction only by tightening plug 3 to plug hole 2 on the side of cylinder head 1 at a specific torque value specified beforehand. As a result, when conducting a quality control of plug 3 and plug hole 2 on the side of cylinder head 1, on which plug 3 is used as a genuine component, it can efficiently and quantitatively be conducted by an easy method.

In particular, with respect to management of plug 3 by plug management gauge 11, as mentioned above, its management is conducted under the management torque value smaller than the specified torque value. Therefore, it results in no crushing deformation of gasket 8 and no blockage of sealing performance of gasket 8 itself.

Furthermore, with respect to plug hole management gauge 15, it is produced by using plug management gauge 11 as a master. Therefore, it becomes possible to accurately produce the gauge to form a pair of male and female. In this case, the material of cylinder head 1 having female screw portion 10 is different from the material of screw ring-form, plug management gauge 11. Therefore, even if plug 3 is tightened to plug management gauge 11 at the specified torque value, to be accurate, it turns into no reproduction of the condition of the case in which plug 3 has actually been tightened to cylinder head 1, that is, the orientation of ground electrode 33. Regarding this point, in the above embodiment, previously considering the difference of material between the gauge and cylinder head 1, it turns out to previously correct the deviation of the orientation of ground electrode 33 based on the difference of the material. Therefore, the orientation of two-sided width portion 18, 19 of plug hole management gauge 15 turns out to coincide with the orientation of ground electrode 33 of plug 3 tightened at the specified torque value. Thus, it becomes possible to easily conduct quality assurance of each of plug 3 and cylinder head 1 with high precision.

Herein, besides phase control of screw-cutting start position of female screw portion 10 in the above-mentioned plug hole 2, for example, when conducting a sampling inspection of after-assembly cylinder head 1 having plug 3 mounted thereon, the above plug hole management gauge 15 can also be used to check whether or not the orientation of ground electrode 33 on the side of plug 3 is at the center position of its tolerance in the case of tightening at mean value of the specified torque values.

Furthermore, in the above embodiment, the relation between plug 3 and plug hole 2 with which plug 3 is screwed has been explained as an example. Based on its gist, the present invention can also be applied to the management of similar parts, etc. besides plug.

The invention claimed is:

1. A method for conducting quality control of a screw component, the method being a method for previously managing a phase position in a rotational direction when a screw component having a sealing portion that demonstrates a sealing function by plastic deformation is tightened to a corresponding screw portion with a specified torque value,
    wherein a management torque value lower than the specified torque value is previously determined,
    wherein a gauge having a screw portion that is capable of being screwed on the screw component is prepared,
    wherein there are previously each determined upper and lower limit positions of a tolerance of the phase position in the rotational direction in the screw component, when the screw component and the gauge are screwed together and tightened with the management torque value,
    wherein it is judged as a non-defective product in case that a reference portion at the phase position in the rotational direction in the screw component is within a range of the upper and lower limit positions of the tolerance, and it is judged as a defective product in case that the reference portion at the phase position in the rotational direction is not within a range of the upper and lower limit positions of the tolerance, when the screw component and the gauge are screwed together and tightened with the management torque value is evaluated.

2. The method for conducting quality control of a screw component as claimed in claim 1, wherein the screw component is a screwed shaft component having a male screw portion, and the gauge is a screwed ring-form one having a female screw portion.

3. The method for conducting quality control of a screw component as claimed in claim 2, wherein there are each provided, on the gauge, indicators showing upper and lower limit positions of a tolerance of the phase position in the rotational direction in the screwed shaft component, when the screwed shaft component and the gauge are screwed together and tightened with the management torque value,
    wherein it is judged as a non-defective product in case that a reference portion at the phase position in the rotational direction in the screwed shaft component is within a range of indicators indicative of the upper and lower limit positions of the tolerance, and it is judged as a defective product in case that the reference portion at the phase position in the rotational direction is not within the range of the indicators indicative of the upper and lower limit positions of the tolerance, when the screwed shaft component and the gauge are screwed together and tightened with the management torque value is evaluated.

4. The method for conducting quality control of a screw component as claimed in claim 3, wherein the gauge is provided further with an indicator that is indicative of mean of tolerance with respect to the reference portion of the phase position in the rotational direction in the screwed shaft component when the screwed shaft component has been tightened at mean of the specified torque value.

5. A method for conducting quality control of a screw component, the method being a method for controlling a screw-cutting start position of a female screw portion so that a phase position in a rotational direction when a screwed shaft component having a sealing portion that demonstrates a sealing function by plastic deformation has been tightened to a female screw portion, which is a corresponding screwed hole, with a specified torque value,
    wherein there is provided a screw shaft-form gauge produced based on the gauge as claimed in claim 4 as a master gauge,
    wherein the indicator on a side of the master gauge, which shows mean of the tolerance has been copied on this screw shaft-form gauge,
    wherein screw-cutting start position of the female screw portion is judged to be at a right position in case that the indicator is at a particular phase position in the rotational direction, and the screw-cutting start position of the female screw portion is judged not to be at a right position in case that the indicator is not at a particular phase position, when the screw shaft-form gauge has been tightened to the female screw portion, which is the corresponding screwed hole, at mean of a specified torque value.

6. The method for conducting quality control of a screw component as claimed in claim 5,
    wherein the screw shaft component is previously provided with a sealing component that demonstrates a sealing function by plastic deformation.

7. The method for conducting quality control of a screw component as claimed in claim 6,
    wherein the screw shaft component is a spark plug having a gasket as the sealing component and a ground electrode as a reference portion at a phase position in the rotational direction,
    wherein there is judged whether or not the screw-cutting start position of the female screw portion, into which spark plug is tightened, is at a right position.

8. A gauge for conducting quality control of a screw component, which is the screw shaft-form gauge used for the method for conducting quality control of the screw component as claimed in claim 7,
- wherein, with respect to a stepped, shaft-form, gauge main body comprising a large-diameter shaft portion and a small-diameter shaft portion, a male screw portion is formed over a predetermined range on the side of opposite of the large-diameter shaft portion from a position of the small-diameter shaft portion which is nearest to the large-diameter shaft portion,
- wherein a single flat surface or a two-sided width portion, which is parallel with a shaft center, is formed on an outer peripheral surface of a shaft end by copying an indicator on a side of the master gauge, which shows mean of the tolerance.

9. The method for conducting quality control of a screw component as claimed in claim 2,
- wherein the screwed shaft component is previously provided with a sealing component for achieving sealing function by plastic deformation.

10. The method for conducting quality control of a screw component as claimed in claim 9, wherein the screwed shaft component is a spark plug having a gasket as the sealing component and a ground electrode as the reference portion of the phase position in the rotational direction,
- wherein, when the spark plug has been tightened to a plug hole having a female screw portion at the specified torque value, there is judged whether or not orientation of the ground electrode is at a proper position.

11. A gauge for conducting quality control of a screw component, which is a gauge used for the method for conducting quality control of the screw component as claimed in claim 10,
- wherein a gauge main body is provided with indicators showing upper and lower limit positions of tolerance with respect to orientation of the ground electrode in the spark plug, when the spark plug has been tightened at a management torque value, and an indicator showing mean of tolerance with respect to orientation of the ground electrode in the spark plug, when tightened at mean of the specified torque value.

12. The gauge for conducting quality control of a screw component as claimed in claim 11, wherein the indicators showing the upper and lower limit positions of the tolerance with respect to the orientation of the ground electrode are marked lines formed on the gauge main body by scribed lines, and the indicator showing mean of tolerance with respect to the orientation of the ground electrode is a two-sided width portion formed on an outer peripheral surface of the gauge main body.

13. A quality control gauge set characterized by comprising the gauge for quality control as claimed in claim 12, and a gauge for quality control of a screw component, which is a screw shaft-form gauge,
- wherein, with respect to a stepped, shaft-form, gauge main body comprising a large-diameter shaft portion and a small-diameter shaft portion, a male screw portion is formed over a predetermined range on the side of opposite of the large-diameter shaft portion from a position of the small-diameter shaft portion which is nearest to the large-diameter shaft portion,
- wherein a single flat surface or a two-sided width portion, which is parallel with a shaft center, is formed on an outer peripheral surface of a shaft end by copying an indicator on a side of the master gauge, which shows mean of the tolerance.

* * * * *